United States Patent [19]

Morihisa et al.

[11] 4,351,021
[45] Sep. 21, 1982

[54] POWER SUPPLY/AUTO-CLEAR CIRCUIT

[75] Inventors: Mitsuo Morihisa, Nara; Tadao Inoue, Kawachinagano, both of Japan

[73] Assignee: Sharp Kabushiki Kaisha, Osaka, Japan

[21] Appl. No.: 235,633

[22] Filed: Feb. 18, 1981

[30] Foreign Application Priority Data

Feb. 18, 1980 [JP] Japan .................................. 55-19522

[51] Int. Cl.³ ............................................. H02M 7/02
[52] U.S. Cl. ....................................... 363/49; 323/901
[58] Field of Search ........................ 323/901, 299, 303; 363/49

[56] References Cited

U.S. PATENT DOCUMENTS 3,444,481  5/1969  Fisher ................................ 363/49 X
4,017,787  4/1977  Hara et al. ............................ 363/49

OTHER PUBLICATIONS

IC Power Supply, Elektor, vol. 3, No. 2, Feb. 1977, pp. 26–30.

Primary Examiner—A. D. Pellinen
Attorney, Agent, or Firm—Birch, Stewart, Kolasch & Birch

[57] ABSTRACT

A power supply circuit includes a rectifier for converting an alternating voltage to a DC voltage for driving a single chip LSI microcomputer control system in, for example, a microwave oven. A switching circuit is included in the power supply circuit for developing an output DC voltage only after the DC voltage derived from the rectifier reaches a preselected level. The switching circuit includes large current transistors connected in the Darlington fashion, whereby the power supply circuit develops the output DC voltage with a short leading transient period which is required for developing an auto-clear signal in the single chip LSI microcomputer control system.

8 Claims, 6 Drawing Figures (TRANSISTOR DRIVER -40-)

POWER SUPPLY/AUTO-CLEAR CIRCUIT

BACKGROUND AND SUMMARY OF THE INVENTION

The present invention relates to a power supply circuit for an electronic apparatus employing a microcomputer.

Recently, various domestic appliances, such as a microwave oven, have been equipped with a microcomputer control system. The microcomputer controlled microwave oven is very effective because various cooking sequencies are automatically controlled.

The microcomputer control system comprises a central processor unit, a read only memory, and a random access memory. These elements are integrated in a single chip LSI. For the proper operation of such a microcomputer control system, all counters must be automatically cleared when the main power supply switch is thrown.

The microwave oven is supplied with power from the commercial power supply. Generally, the commercial power supply develops the sinusoidal alternating voltage of 50 Hz or 60 Hz. The microcomputer control system requires a D.C. voltage to perform its function and, therefore, a power supply circuit is employed to obtain a desired D.C. voltage. The power supply circuit includes a large capacity capacitor for regulation purposes and for protecting the microcomputer control system from a sudden interruption of the power supply. The large capacity capacitor slows down the response characteristics of the power supply and, therefore, the conventional power supply circuit exhibits a leading transient period longer than several tens of milliseconds.

On the other hand, the LSI microcomputer control system is normally designed to respond to the leading transient period shorter than 10 msec because of its considerably short time constant characteristics. The conventional switching regulator system is suited for shortening the leading transient period, but the switching regulator system requires a great number of circuit elements and inevitably generates noises because of high-frequency operation.

Accordingly, an object of the present invention is to provide a power supply circuit suited for an LSI microcomputer system.

Another object of the present invention is to provide an AC-DC converter showing a short leading transient period.

Still another object of the present invention is to provide a power supply circuit of a simple construction suited for developing an auto-clear signal in an LSI microcomputer system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a rectifying circuit is provided for converting the alternating commercial power supply voltage to a D.C. voltage of a desired level. A switching circuit is interposed between the rectifying circuit and a single chip LSI microcomputer control system. A time constant circuit is further provided for switching on the above-mentioned switching circuit when an output voltage of the rectifying circuit reaches a preselected level. Thus, the power supply circuit supplies a voltage to the single chip LSI microcomputer control system with a short leading transient period.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a better understanding of the present invention, an example of a conventional power supply circuit will be first described.

Figure 1:
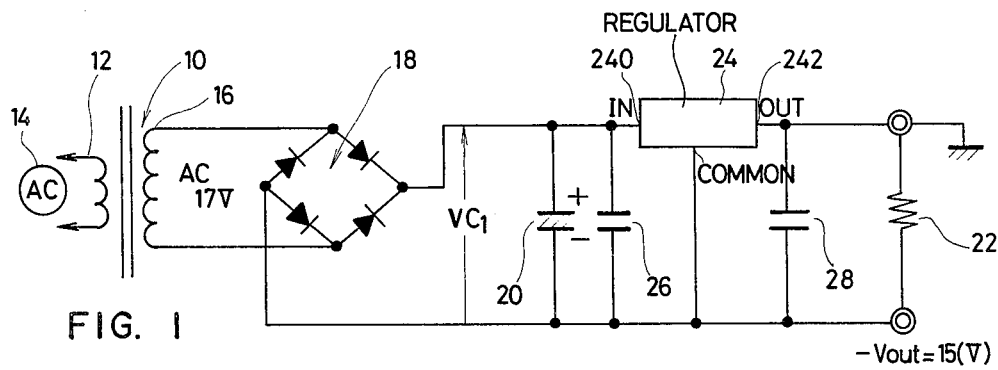
FIG. 1 is a circuit diagram of a conventional power supply circuit.

FIG. 1 shows the conventional power supply circuit including a three-terminal regulator. A primary winding 12 of a transformer 10 is connected to an alternating commercial power supply source 14 (AC 100 V, 50 Hz/60 Hz), and a secondary winding 16 of the transformer 10 is connected to a rectifier 18. DC output terminals of the rectifier 18 are connected to a smoothing capacitor 20 (2200 μF) and a load 22. A three-terminal regulator 24 is disposed between the smoothing capacitor 20 and the load 22. A capacitor 26 (0.1 μF) is connected to the input terminal 240 of the three-terminal regulator 24 for protecting the three-terminal regulator 24 from an erroneous oscillation and a high transient voltage. Another capacitor 28 (0.1 μF) is connected to the output terminal 242 of the three-terminal regulator 24 for improving the transient response when the load 22 suddenly changes.

Figure 2:
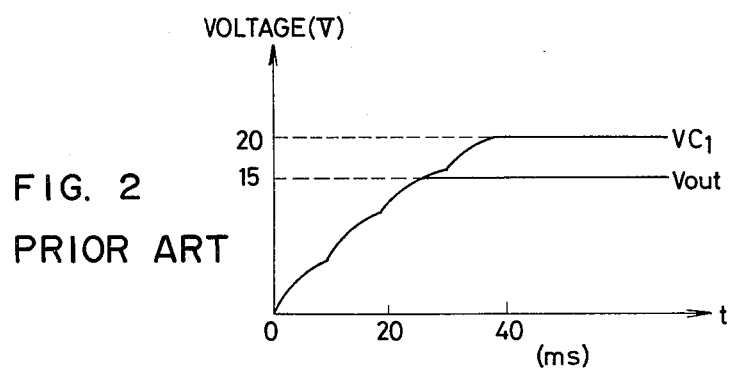
FIG. 2 is a graph showing output characteristics of the power supply circuit of FIG. 1.

It will be clear from FIG. 2 that the output voltage does not show a preferable response period when the commercial power supply is initiated. Accordingly, the conventional power supply circuit is not suited for a single chip LSI microcomputer control system wherein an autoclear signal must be developed when the main power supply is initiated. The long period leading transient is mainly derived from the large capacity smoothing capacitor 20.

Figure 3:
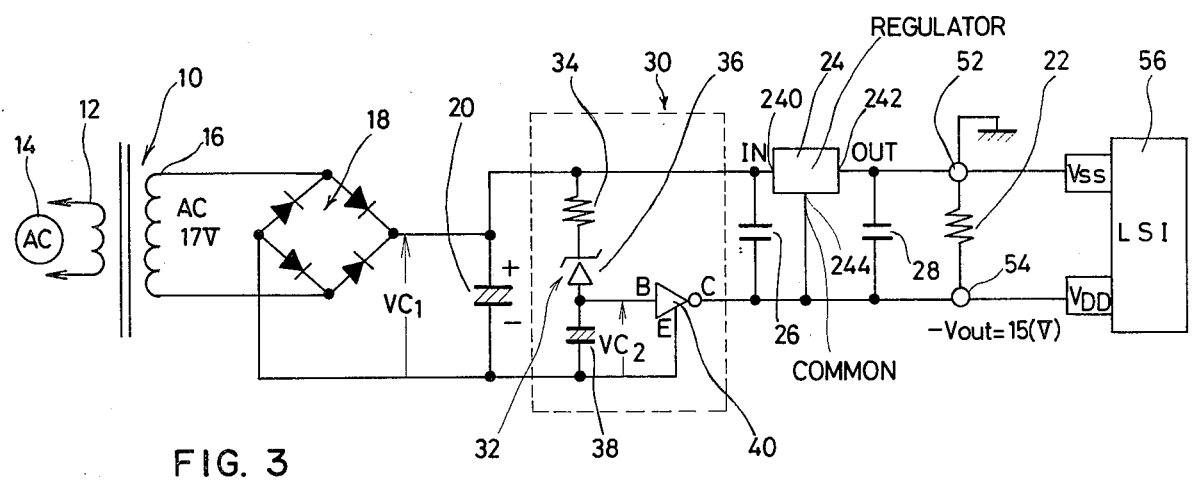
FIG. 3 is a circuit diagram of an embodiment of a power supply circuit of the present invention.

FIG. 3 shows an embodiment of a power supply circuit of the present invention. Like elements corresponding to those of FIG. 1 are indicated by like numerals.

A switching circuit 30 is disposed between the smoothing capacitor 20 and the three-terminal regulator 24. The switching circuit 30 comprises a time constant circuit 32 including a resistor 34 a Zener diode 36 and a capacitor 38 (10 μF). The time constant circuit 32 is connected to the smoothing capacitor 20 in a parallel fashion. The capacitor 38 is connected to a transistor driver 40 so that the B-terminal and the E-terminal of the transistor driver 40 are connected to the opposing terminals of the capacitor 38. The C-terminal of the transistor driver 40 is connected to the common terminal 244 of the three-terminal regulator 24.

Figure 4:
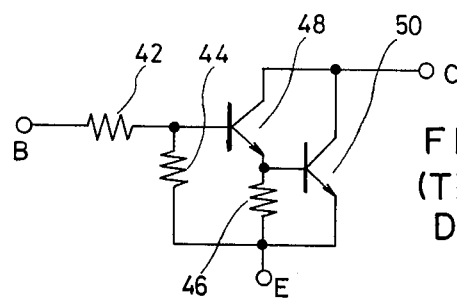
FIG. 4 is a circuit diagram of a transistor driver included in the power supply circuit of FIG. 3.

FIG. 4 shows a detailed construction of the transistor driver 40. The transistor driver 40 comprises resistors 42, 44 and 46, and a Darlington circuit including large current transistors 48 and 50. The transistor driver 40 performs large current switching in response to a small current input. Further, the transistor driver 40 performs a rapid switching operation when an input voltage $VC_2$ exceeds a threshold voltage (for example, 2.5 V). Thus, the power supply circuit of the present invention develops an output DC voltage with a short leading transient period.

When the main power supply switch is switched on, the smoothing capacitor 20 is charged. The charge voltage $VC_1$ gradually increases. When the voltage $VC_1$ reaches the Zener voltage $V_z$(12 V) determined by the Zener diode 36, an electric current flows through the resistor 34 and the Zener diode 36. In response thereto, the capacitor 38 is charged.

That is, the Zener diode 36 functions to delay the charging operation of the capacitor 38 with respect to the charging operation of the smoothing capacitor 20. Further, the Zener diode 36 functions to prevent the occurrence of current flowing from the smoothing capacitor 20 to the capacitor 38 when the commercial power supply is terminated, thereby immediately returning the capacitor 38 to its initial condition.

Figure 5:
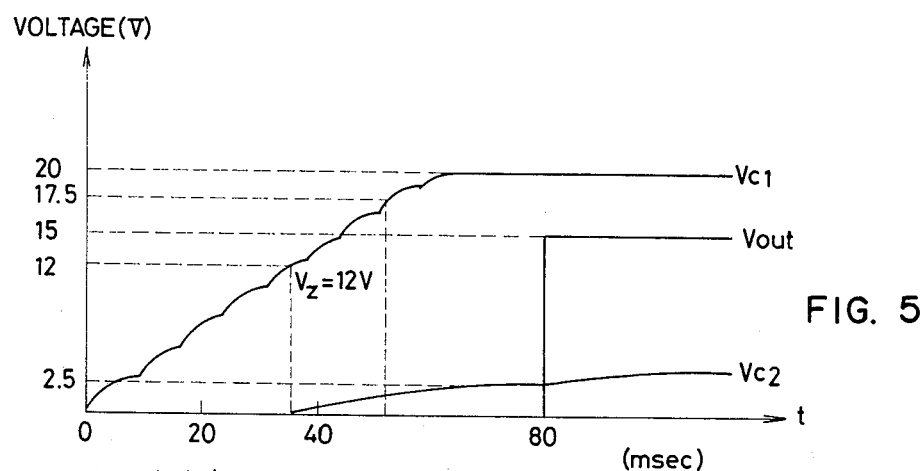
FIG. 5 is a graph showing output characteristics of the power supply circuit of FIG. 3.
Figure 6:
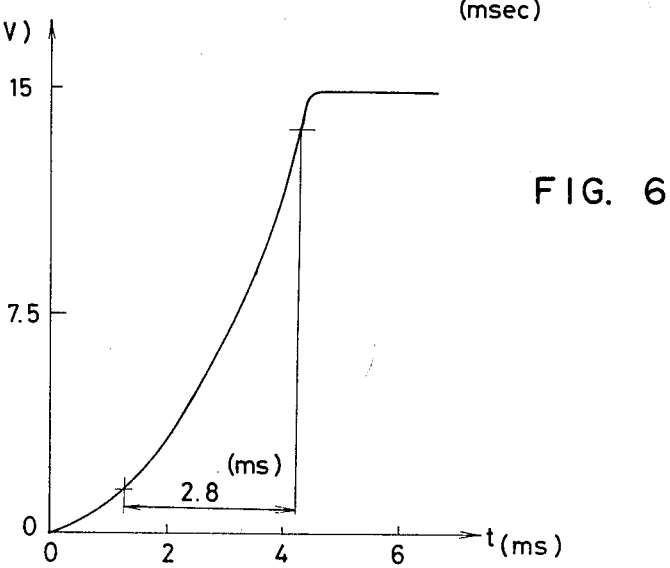
FIG. 6 is a graph showing a leading transient characteristics of the power supply circuit of FIG. 3.

When the charge voltage $VC_2$ of the capacitor 38 reaches a threshold voltage (2.5 V) of the transistor driver 40, the transistor driver 40 is switched on to connect the E-terminal to the C-terminal. In response thereto, the output voltage of the rectifier 18 is applied to the input terminal 240 of the three-terminal regulator 24. At this moment, the charge voltage $VC_1$ of the smoothing capacitor 20, which is applied to the input terminal 240 of the three-terminal regulator 24, is already higher than 17.5 V as shown in FIG. 5, and therefore, an output voltage $V_{OUT}$(15 V) is developed across output terminals 52 and 54 with a rapid transient due to the rapid switching characteristics of the transistor driver 40. In this embodiment, the leading transient period is about 2.8 msec as shown in FIG. 6. A single chip LSI microcomputer control system 56 is connected to the output terminals 52 and 54.

The charging operation for the capacitor 38 is initiated about 40 msec later than the initiation of the commercial power supply as shown in FIG. 5. Further 40 msec are required to charge the capacitor 38 to the threshold voltage 2.5 V to switch on the transistor driver 40. Thus, the output voltage $V_{OUT}$ is obtained when about 80 msec have passed from the throwing operation of the commercial power supply. More specifically, the resistor 34, the Zener diode 36 and the capacitor 38 are selected so that the transistor driver 40 is switched on after the voltage $VC_1$ derived from the smoothing capacitor 20 exceeds the minimum operation voltage of the three-terminal regulator 24.

A preferred three-terminal regulator 24 is μPC 78M 15 manufactured by Nippon Electric Company, Ltd. The μPC 78M 15 develops an output voltage between 14.25 V and 15.75 V in response to an input voltage between 17.5 V and 30 V. A preferred single chip LSI microcomputer control system 56 is M 58840 manufactured by Mitsubishi Denki Kabushiki Kaisha.

The invention being thus described, it will be obvious that the same may be varied in many ways. Such variations are not to be regarded as a departure from the spirit and scope of the invention, and all such modifications are intended to be included within the scope of the following claims.

We claim:

1. A power supply circuit comprising:
   rectifying means for converting an alternating voltage to a DC voltage;
   output terminal means for providing the DC voltage to a load;
   switching means for selectively connecting said output terminal means to said rectifying means; and
   control means for actuating said switching means when the DC voltage derived from said rectifying means reaches a preselected level after application of said alternating voltage to said rectifying means.

2. The power supply circuit of claim 1, wherein said control means comprises a time constant circuit including a Zener diode.

3. The power supply circuit of claim 2, wherein said switching means comprises Darlington connected transistors.

4. The power supply circuit of claim 1, 2 or 3, further comprising a voltage regulator connected between said switching means and said output terminal means.

5. The power supply circuit of claim 4, wherein said regulator comprises a three-terminal regulator of which an input terminal is connected to said rectifying means, an output terminal is connected to said output terminal means, and a common terminal is connected to said switching means.

6. A power supply circuit comprising:
   input means for receiving a rectified voltage;
   filter capacitor means for absorbing variations in said rectified voltage;
   a load receiving said rectified voltage;
   capacitor threshold timing means for electrically interconnecting said load across said filter capacitor means to present said rectified voltage to said load a predetermined time period after said filter capacitor means reaches a threshold.

7. The power supply of claim 6 wherein said capacitor threshold timing means includes a zener diode.

8. The power supply of claim 7 wherein said capacitor threshold timing means further includes timing capacitor means for measuring said predetermined time period;
   said zener diode, when conductive, charging said timing capacitor means.

* * * * *